United States Patent
Noboru et al.

(10) Patent No.: US 6,793,393 B2
(45) Date of Patent: Sep. 21, 2004

(54) COPPER-BASED SINTERED ALLOY BEARING FOR MOTOR FUEL PUMP

(75) Inventors: Kanezaki Noboru, Columbus, IN (US); Maruyama Tsuneo, Niigata (JP)

(73) Assignee: Mitsubishi Materials Corporation, Tokyo (JP)

(*) Notice: Subject to any disclaimer, the term of this patent is extended or adjusted under 35 U.S.C. 154(b) by 95 days.

(21) Appl. No.: 10/323,714

(22) Filed: Dec. 19, 2002

(65) Prior Publication Data

US 2004/0120614 A1 Jun. 24, 2004

(51) Int. Cl.$^7$ .............................................. F16C 33/06
(52) U.S. Cl. .................... 384/42; 384/279; 384/492; 384/569; 384/912; 384/913
(58) Field of Search .................... 384/42, 129, 279, 384/492, 569, 912, 913

(56) References Cited

U.S. PATENT DOCUMENTS

| 4,608,085 A | * | 8/1986 | Eudier et al. ................... 75/247 |
| 6,089,843 A | * | 7/2000 | Kondoh ........................ 418/179 |

* cited by examiner

*Primary Examiner*—Lenard A. Footland
(74) *Attorney, Agent, or Firm*—Darby & Darby

(57) ABSTRACT

This bearing for a motor fuel pump is made of a graphite dispersion type Cu-based sintered alloy with a composition consisting essentially of 20 to 40% by weight of Ni, 0.1 to 0.9% by weight of P and 1 to 8% by weight of C, and the balance of Cu and inevitable impurities, the graphite dispersion type Cu-based sintered alloy having a porosity of 5 to 25%.

3 Claims, 1 Drawing Sheet

COPPER-BASED SINTERED ALLOY BEARING FOR MOTOR FUEL PUMP

BACKGROUND OF THE INVENTION

1. Field of the Invention

The present invention relates to a Cu-based sintered alloy bearing which exhibits excellent wear resistance when applied to small motor fuel pumps driven at high rotation speeds.

2. Background Art

Generally, an engine that uses, as a fuel, liquid fuel such as gasoline or light oil, has conventionally been equipped with a motor fuel pump. As the motor fuel pump for a gasoline engine, for example, a motor fuel pump shown in FIG. 1 is known.

In the motor fuel pump shown in FIG. 1, a rotating shaft 3 fixed to both ends of a motor 2 is supported by a bearing 4 in a casing 1. Into one end of the rotating shaft 3, an impeller 5 is inserted and also a narrow gasoline passage is formed along the outer periphery of impeller 5, the outer periphery of the motor 2 (armature) and the space (not shown) between the bearing 4 and the rotating shaft 3. The reference symbol 6 denotes a magnet.

The bearing 4 is made of various Cu-based sintered alloys.

When the motor 2 is rotated to rotate the impeller 5, gasoline is charged into the casing 1 as a result of the rotation of the impeller 5. The charged gasoline is sent to a gasoline engine provided separately through the outer peripheral surface of impeller 5, the outer peripheral surface of the motor 2 (armature) and the space (not shown) between the bearing 4 and the rotating shaft 3.

In the pump shown in FIG. 1, an extremely small quantity of gasoline, the pressure of which was raised by the impeller 5, pass through the outer peripheral portions of both being 4 and, furthermore, gasoline reaches the outer peripheral surface of the armature through a fuel passage (not shown) of the casing.

With recent remarkable development of light-weight and high-performance engines for automobiles, size reduction of fuel pumps used in the engines has been strongly required. In the case of the motor fuel pump having the above structure, high drive that is, an increase in rotation speed, is required to yield size reduction while maintaining discharging performance.

Since liquid fuels such as gasoline charged into the fuel pump flows through a narrower passage at a high flow rate under high pressure, higher strength and excellent wear resistance are particularly required of a bearing of a motor fuel pump.

However, no conventional Cu-based sintered alloy bearing has sufficient strength or sufficient wear resistance and therefore wear progresses rapidly. Furthermore, in the case in which liquid fuel contains sulfur or a compound thereof as impurities, wear is further accelerated, resulting in failure within a relatively short period.

BRIEF SUMMARY OF THE INVENTION

Under these circumstances, the present inventors have studied to develop a bearing suited for use in a small motor fuel pump driven at high rotation speed.

As a result, they have found that the following effects (1) to (3) can be obtained in the following three kinds of aspects (A) to (C):

(A) a bearing for a motor fuel pump is made of a graphite dispersion type Cu-based sintered alloy with a composition consisting essentially, by weight (hereinafter, percentages are by weight unless otherwise stated), of 20 to 40% of Ni, 0.1 to 0.9% of P and 1 to 8% of C, and the balance of Cu and inevitable impurities, the Cu-based sintered alloy having, a porosity of 5 to 25%;

(B) a bearing for motor fuel pump is made of a Cu-based sintered alloy with a composition consisting essentially of 20 to 40% of Ni, 0.1 to 0.9% of P and 0.5 to 5% of molybdenum disulfide (hereinafter referred to as $MoS_2$), and the balance of Cu and inevitable impurities. This alloy has a structure wherein a hard Cu-P compound and molybdenum disulfide having high lubricity are dispersed and distributed in a matrix made of a solid solution phase of a Cu—Ni alloy, and has a porosity of 5 to 25%; and (C) a bearing for motor fuel pump is made of a Cu-based sintered alloy with a composition consisting essentially of 20 to 40% of Ni, 0.1 to 0.9% of P, 0.5 to 5% of C and 0.5 to 5% of $MoS_2$, and the balance of Cu and inevitable impurities. This alloy has a structure wherein a hard Cu—P compound as well as free graphite and molybdenum disulfide having high lubricity are dispersed and distributed in a matrix made of a solid solution phase of a Cu—Ni alloy, and has a porosity of 5 to 25%.

The effects obtained by the above respective aspects (A) to (C) are as follows.

(1) Through pores in the bearing, liquid fuel is supplied to the inner peripheral surface of the bearing from the outer peripheral surface of the bearing, and thus a fluid lubricating film is formed and frictional resistance of the bearing caused by high-speed rotation of the motor is relieved by an action of the fluid lubricating film.

(2) Although the wear resistance is lowered in proportion as pores are formed, the hard Cu—P compound dispersed and distributed in the matrix made of the solid solution phase of the Cu—Ni alloy as well as free graphite having high lubricity and/or high-lubricating molybdenum disulfide $MoS_2$, which are also dispersed and distributed in the matrix, make up for lowering of the wear resistance. Therefore, the bearing exhibits excellent wear resistance in environments exposed to liquid fuel flowing through at high flow rate under high pressure by the synergistic effect of high strength and excellent corrosion resistance of the Cu—Ni alloy constituting the matrix.

(3) Also these Cu-based sintered alloy bearings exhibit excellent corrosion resistance to liquid fuel containing sulfur or a compound thereof as impurities.

DETAILED DESCRIPTION OF THE INVENTION

Figure 1:
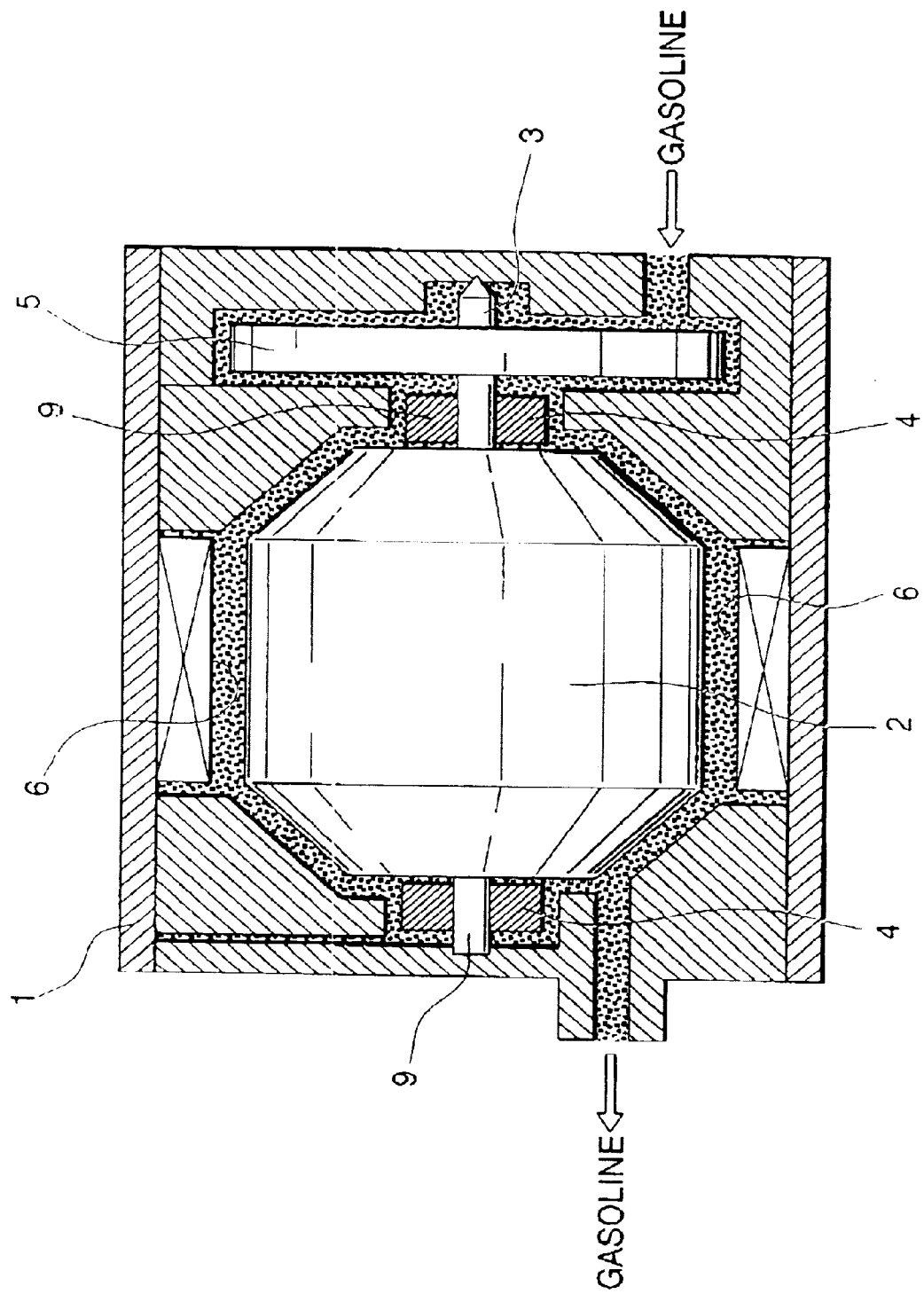
FIG. 1 is a sectional view showing a conventional motor fuel pump.

With the above respective aspects (A) to (C) of tile present invention, the reason why the composition, the structure and the porosity of the Cu-based sintered alloy were limited as described above will now be described.

Re: Aspect (A)
(1) Composition
 (i) Ni

The Ni component has an effect of improving the strength and the corrosion resistance of the bearing by forming a matrix made of a solid solution phase of a Cu—Ni alloy as a result of incorporation into Cu. When the content of Ni is less than 20%, desired high strength and high corrosion resistance cannot be ensured. On the other hand, when the content of Ni exceeds 40%, the strength is lowered. Therefore, the Ni content was defined within a range from 20 to 40%. The Ni content is preferably from 21 to 30%.

(ii) P

The P component has an action of contributing to an improvement in the bearing strength by improving the sinterability and improving the wear resistance by forming a hard Cu—P alloy dispersed and distributed in a matrix. When the content of P is less than 0.1%, the desired effect cannot be obtained in the above action. On the other hand, when the content of P exceeds 0.9%, the strength tends to be lowered and it becomes difficult to stably ensure the desired high strength. Therefore, the P content was defined within a range from 0.1 to 0.9%. The P content is preferably within a range from 0.3 to 0.6%.

(iii) C

The C component has an effect of contributing to an improvement in the wear resistance of the bearing by imparting excellent lubricity to the bearing as a result of dispersion and distribution in the matrix in the form of free graphite. When the content of C is less than 1%, the desired effect cannot be obtained in the above action. On the other hand, when the content of C exceeds 8%, the strength is rapidly decreased. Therefore, the C content was defined within a range from 1 to 8%. The C content is preferably within a range from 2 to 6%.

(2) Porosity

Pores dispersed in the matrix of the Cu—Ni alloy have an effect of remarkably suppressing wear of the bearing by believing strong friction and high facial pressure of the bearing caused by liquid fuel flowing through at a high flow rate under high pressure. When the porosity is less than 5%, the proportion of pores distributed in the matrix is too reduced to sufficiently exert the above action. On the other hand, when the porosity exceeds 25%, the strength of the bearing is rapidly lowered. Therefore, the porosity was defined within a range from 5 to 25% by volume. The porosity is preferably within a range from 10 to 20% by volume.

Re: Aspect (B)

(1) Composition (i) The Ni component is the same as in the aspect A.

(ii) The P component is the same as in the aspect A.

(iii) $MoS_2$

That $MoS_2$ component has an action of contributing to an improvement in the wear resistance of the bearing by imparting excellent lubricity to the bearing as a result of dispersion and distribution in the matrix in the form of a $MoS_2$ phase. When the content of $MoS_2$ is less than 0.5%, the desired excellent lubricity cannot be obtained. On the other hand, when the content exceeds 5%, the strength is rapidly lowered. Therefore, the $MoS_2$ content was defined within a range from 0.5 to 5%. The $MoS_2$ content is preferably within a range from 1 to 3%.

(2) The porosity is the same as in the aspect A.

Re: Aspect (C)

(1) Composition (i) The Ni component is the same as in the aspect A.

(ii) The P component is the same as in the aspect A.

(iii) C and $MoS_2$

These two components have exclusively an effect of contributing to an improvement in the wear resistance of the bearing by imparting excellent lubricity to the bearing in a co-existing state as a result of dispersion and distribution in the matrix in the form of free graphite and $MoS_2$. In the case of adding both C and $MoS_2$, when the content of either C or $MoS_2$ is less than 0.5%, the effect of improving the lubricity is relatively lowered. On the other hand, when the content of either C or $MoS_2$ exceeds 5%, relative lowering of the strength cannot be avoided. Therefore, each content was specified to be within a range of 0.5 to 5%. Each content is preferably within a range of 1 to 3%.

(2) The porosity is the same as in the aspect A.

EXAMPLES

Effects of the respective aspects will now be described by way of Examples.

Re: Aspect (A)

As raw powders, various Cu—Ni alloy powders formed by a water atomizing method, each having a mean grain size of 45 $\mu$m but having a different Ni content, a water-atomized Cu—P alloy (containing 33% of P) having a mean grain size of 45 $\mu$m and a graphite powder having a mean grain size of 75 $\mu$m were prepared.

According to each predetermined composition, these raw powders were mixed in a ball mill for 40 minutes and pressed into green compacts under a predetermined pressure within a range from 150 to 300 MPa. The resulting green compacts were sintered in an ammonia decomposition gas atmosphere under the conditions of a predetermined temperature within a range from 750 to 900° C. for 40 minutes to obtain Examples A1 to A20 made of the graphite dispersion type Cu-based sintered alloy having the composition and porosity shown in Table 1. The respective Examples have an outer diameter of 9 mm, an inner diameter of 5 mm and a height of 6 mm.

Arbitrary cross section of Examples A1 to A20 was visually observed by an optical microscope (magnification:× 200). All Examples exhibited a structure wherein a Cu—P alloy and free graphite are finely dispersed and distributed in a matrix made of a solid solution phase of a Cu—Ni alloy and also pores exist.

For comparison, Comparative Examples A1 to A8 were produced under the same conditions, except that the composition was replaced by the composition as shown in Table 1. With respect to all Comparative Examples A1 to A8, either parameter of the content of the alloying component and porosity is not within a scope of the present invention.

Examples A1 to A20 and Comparative Examples A1 to A8 were assembled into a fuel pump having a structure shown in FIG. 1 and having an outside dimension of 110 mm in length and 40 mm in diameter and, after mounting the fuel pump in a gasoline tank, a practical test was conducted under the following conditions:

Rotation speed of impeller: 3000 rpm (minimum rotation speed) to 10000 rpm (maximum rotation speed).

Flow rate of gasoline: 45 liter/hour (minimum flow rate) to 150 liter/hour (maximum flow rate), Pressure applied on bearing by high-speed rotating shaft: maximum 300 KPa, and Test time: 200 hours.

Under these conditions, gasoline flows through a narrow space between the pump at high flow rate, while high pressure is applied to the bearing by the high-speed rotating shaft of the motor and the bearing is exposed to gasoline flowing through at high flow rate.

After the completion of the practical test, a maximum wear depth on the bearing surface was measured. The measurement results are also shown in Table 1. The strength of the sintered bearing is shown in Table 1 for the purpose of evaluating the strength.

TABLE 1

| No. | Composition (% by weight) | | | | Porosity (%) | Crushing strength (N/mm²) | Maximum wear depth (μm) |
|---|---|---|---|---|---|---|---|
| | Ni | P | C | Cu+ impurities | | | |
| Test Examples | | | | | | | |
| A1 | 21.1 | 0.43 | 3.12 | balance | 15.2 | 152 | 1.1 |
| A2 | 23.4 | 0.46 | 3.03 | balance | 14.7 | 158 | 1.2 |
| A3 | 24.8 | 0.45 | 3.02 | balance | 14.6 | 156 | 1.1 |
| A4 | 28.5 | 0.45 | 2.87 | balance | 15.2 | 150 | 1.3 |
| A5 | 34.5 | 0.42 | 2.95 | balance | 15.0 | 147 | 1.2 |
| A6 | 39.4 | 0.41 | 2.85 | balance | 14.9 | 142 | 1.3 |
| A7 | 23.2 | 0.12 | 3.06 | balance | 14.6 | 132 | 1.8 |
| A8 | 23.7 | 0.32 | 2.96 | balance | 15.1 | 140 | 1.4 |
| A9 | 23.1 | 0.57 | 3.07 | balance | 15.4 | 150 | 1.3 |
| A10 | 22.8 | 0.73 | 3.10 | balance | 15.8 | 146 | 1.4 |
| A11 | 23.5 | 0.86 | 3.08 | balance | 14.7 | 142 | 1.5 |
| A12 | 22.5 | 0.44 | 1.06 | balance | 15.3 | 156 | 2.8 |
| A13 | 23.1 | 0.47 | 2.08 | balance | 15.5 | 159 | 2.4 |
| A14 | 22.9 | 0.43 | 4.06 | balance | 14.9 | 146 | 1.0 |
| A15 | 23.0 | 0.44 | 5.65 | balance | 14.8 | 134 | 0.9 |
| A16 | 22.4 | 0.41 | 7.68 | balance | 15.0 | 123 | 0.7 |
| A17 | 23.4 | 0.48 | 3.05 | balance | 5.6 | 197 | 2.4 |
| A18 | 23.6 | 0.43 | 3.11 | balance | 10.8 | 165 | 2.1 |
| A19 | 23.2 | 0.47 | 2.99 | balance | 17.9 | 147 | 1.2 |
| A20 | 23.3 | 0.47 | 2.96 | balance | 23.1 | 126 | 1.0 |
| Comparative Examples | | | | | | | |
| A1 | 18.6* | 0.46 | 3.03 | balance | 15.2 | 98 | 1.6 |
| A2 | 41.3* | 0.42 | 3.13 | balance | 15.3 | 94 | 0.8 |
| A3 | 23.6 | 0.06* | 3.04 | balance | 14.7 | 76 | 1.2 |
| A4 | 22.9 | 1.12* | 2.97 | balance | 15.6 | 85 | 2.4 |
| A5 | 23.1 | 0.45 | 0.43* | balance | 15.4 | 187 | 13.0 |
| A6 | 23.0 | 0.46 | 9.24* | balance | 14.8 | 68 | 1.8 |
| A7 | 22.7 | 0.47 | 3.01 | balance | 4.2* | 170 | 12.3 |
| A8 | 23.5 | 0.44 | 3.05 | balance | 26.7* | 78 | 1.8 |

In the table, the symbol * means Examples which are not within the scope of the present invention As is apparent from the results shown in Table 1, all Examples A1 to A20 had high strength and excellent corrosion resistance imparted by the solid solution phase of the Cu—Ni alloy, and also exhibited excellent wear resistance to gasoline flowing at high flow rate under high pressure when used as the bearing of the motor fuel pump because of the action of pores and the hard Cu—P alloy as well as free graphite having high lubricity, which are dispersed and distributed in the matrix.

On the other hand, as is apparent from the results of Comparative Examples A1 to A8, when either parameter of the content of the component and the porosity of the Cu-based sintered alloy is not within the scope of the present invention, lowering of either strength or wear resistance cannot be avoided.

Re: Aspect (B)

As raw powders, various Cu—Ni alloy powders formed by a water atomizing method, each having a mean grain size of 45 μm but having a different Ni content, a water-atomized Cu—P alloy (containing 33% of P) having a mean grain size of 45 μm and a graphite powder having a mean grain size of 75 μm were prepared.

According to each predetermined composition, these raw powders were mixed in a ball mill for 40 minutes and pressed into green compacts under a predetermined pressure within a range from 150 to 300 MPa. The resulting green compacts were sintered in an ammonia decomposition gas atmosphere under the conditions of a predetermined temperature within a range from 750 to 900° C. for 40 minutes to obtain Examples B1 to B20 made of the graphite dispersion type Cu-based sintered alloy having the composition and porosity shown in Table 2. The respective Examples have an outer diameter of 9 mm, an inner diameter of 5 mm and a height of 6 mm.

Arbitrary cross section of Examples B1 to B20 was visually observed by an optical microscope (magnification:× 200). All Examples exhibited a structure wherein a Cu—P alloy and $MoS_2$ are finely dispersed and distributed in a matrix made of a solid solution phase of a Cu—Ni alloy and also pores exist.

For comparison, Comparative Examples B1 to B8 were produced under the same conditions except that the composition was replaced by the composition as shown in Table 2. With respect to all Comparative Examples B1 to B8, either parameter of the content of the alloying component and porosity, is not within a scope of the present invention.

Examples B1 to B20 and Comparative Examples B1 to B8 were assembled into a fuel pump having a structure shown in FIG. 1 and having an outside dimension of 110 mm in length and 40 mm in diameter and, after mounting the fuel pump in a gasoline tank, a practical test was conducted under the following conditions:

Rotation speed of impeller: 3000 rpm (minimum rotation speed) to 8000 rpm (maximum rotation speed),
Flow rate of gasoline: 45 liter/hour (minimum flow rate) to 120 liter/hour (maximum flow rate),
Pressure applied on bearing by high speed rotating shaft: maximum 300 KPa, and
Test time: 250 hours.

Under these conditions, gasoline flows through a narrow space between the pump at high flow rate, while high pressure is applied to the bearing by the high-speed rotating shaft of the motor and the bearing is exposed to gasoline flowing through at high flow rate.

After the completion of the practical test, a maximum wear depth on the bearing surface was measured. The measurement results are also shown in Table 2. The strength of the sintered bearing is shown in Table 2 for the purpose of evaluating the strength.

pressed into green compacts under a predetermined pressure within a range from 150 to 300 MPa. The resulting green compacts were sintered in an ammonia decomposition gas atmosphere under the conditions of a predetermined temperature within a range from 750 to 900° C. for 40 minutes to obtain Examples C1 to C23 made of the graphite dispersion type Cu-based sintered alloy having the composition

TABLE 2

| No. | Composition (% by weight) | | | | Porosity (%) | Crushing strength (N/mm$^2$) | Maximum wear depth ($\mu$m) |
| --- | --- | --- | --- | --- | --- | --- | --- |
| | Ni | P | Mo$_2$S$_2$ | Cu+ impurities | | | |
| Test Examples | | | | | | | |
| B1 | 20.7 | 0.38 | 3.12 | balance | 15.1 | 147 | 1.5 |
| B2 | 22.5 | 0.39 | 3.03 | balance | 15.4 | 156 | 1.4 |
| B3 | 24.7 | 0.41 | 2.42 | balance | 15.8 | 152 | 1.3 |
| B4 | 28.9 | 0.37 | 2.54 | balance | 15.6 | 146 | 1.2 |
| B5 | 34.8 | 0.40 | 2.64 | balance | 15.0 | 141 | 1.1 |
| B6 | 39.2 | 0.37 | 2.61 | balance | 14.9 | 135 | 1.0 |
| B7 | 23.0 | 0.14 | 2.75 | balance | 15.7 | 138 | 1.7 |
| B8 | 23.4 | 0.25 | 2.67 | balance | 15.2 | 140 | 1.5 |
| B9 | 22.8 | 0.55 | 2.49 | balance | 14.3 | 149 | 1.2 |
| B10 | 22.9 | 0.77 | 2.73 | balance | 15.9 | 146 | 1.2 |
| B11 | 23.0 | 0.83 | 2.80 | balance | 14.8 | 132 | 1.2 |
| B12 | 23.5 | 0.39 | 0.54 | balance | 15.6 | 182 | 2.6 |
| B13 | 23.2 | 0.36 | 1.28 | balance | 15.2 | 173 | 2.3 |
| B14 | 23.5 | 0.42 | 2.89 | balance | 14.4 | 147 | 1.8 |
| B15 | 23.3 | 0.38 | 4.02 | balance | 15.8 | 132 | 1.2 |
| B16 | 22.9 | 0.36 | 4.92 | balance | 15.3 | 126 | 1.0 |
| B17 | 23.1 | 0.38 | 2.66 | balance | 5.4 | 182 | 2.0 |
| B18 | 23.4 | 0.42 | 2.58 | balance | 11.4 | 175 | 1.8 |
| B19 | 22.8 | 0.38 | 2.49 | balance | 18.7 | 145 | 1.7 |
| B20 | 23.7 | 0.40 | 2.56 | balance | 23.6 | 127 | 1.9 |
| Comparative Examples | | | | | | | |
| B1 | 18.2* | 0.41 | 2.63 | balance | 15.0 | 97 | 1.4 |
| B2 | 42.1* | 0.37 | 2.84 | balance | 15.1 | 96 | 0.9 |
| B3 | 23.2 | 0.05* | 2.67 | balance | 15.6 | 72 | 8.3 |
| B4 | 23.4 | 1.06* | 2.50 | balance | 15.2 | 78 | 1.1 |
| B5 | 23.3 | 0.40 | 0.36* | balance | 15.1 | 172 | 12.4 |
| B6 | 23.4 | 0.37 | 6.13* | balance | 15.2 | 70 | 2.0 |
| B7 | 23.6 | 0.36 | 2.65 | balance | 3.8* | 205 | 11.6 |
| B8 | 23.4 | 0.42 | 2.77 | balance | 26.5* | 76 | 1.9 |

In the table, the symbol * means Examples which are not within the scope of the present invention As is apparent from the results shown in Table 2, all Examples B1 to B20 had high strength and excellent corrosion resistance imparted by the solid solution phase of the Cu—Ni alloy and also exhibited excellent wear resistance to gasoline flowing through at high flow rate under high pressure when used as the bearing of the motor fuel pump because of the action of pores and the hard Cu—P alloy as well as MoS$_2$ having high lubricity which are dispersed and distributed in the matrix.

On the other hand, as is apparent from the results of Comparative Examples B1 to B8, when either parameter of the content of the component and the porosity of the Cu-based sintered alloy is not within a scope of the present invention, lowering of either strength or wear resistance cannot be avoided.

Re: Aspect (C)

As raw powders, various Cu—Ni alloy powders formed by a water atomizing method, each having a mean grain size of 45 $\mu$m but having a different Ni content, a water-atomized Cu—P alloy (containing 33% of P) having a mean grain size of 45 $\mu$m and a graphite powder and MoS$_2$ powder each having a mean grain size of 75 $\mu$m were prepared.

According to each predetermined composition, these raw powders were mixed in a ball mill for 40 minutes and and porosity shown in Table 3. The respective Examples have an outer diameter of 9 mm, an inner diameter of 5 mm and a height of 6 mm.

Arbitrary cross section of Examples C1 to C23 was visually observed by an optical microscope (magnification:×200). All Examples exhibited a structure wherein Cu—P alloy and free graphite as well as MoS$_2$ are fined dispersed and distributed in a matrix made of a solid solution phase of a Cu—Ni alloy and also pores exist.

For comparison, Comparative Examples C1 to C10 were produced under the same conditions, except that the composition was replaced by the composition as shown in Table 3. All Comparative Examples C1 to C10 were made of a Cu-based sintered alloy wherein either parameter of the content of the alloying component and porosity is not within the scope of the present invention.

Examples C1 to C23 and Comparative Examples C1 to C10 were assembled into a fuel pump having a structure shown in FIG. 1 and having an outside dimension of 110 mm in length and 40 mm in diameter and, after mounting the fuel pump in a gasoline tank, a practical test was conducted under the following conditions:

Rotation speed of impeller: 2000 rpm (minimum rotation speed) to 10000 rpm (maximum (rotation speed), Flow rate of gasoline: 30 liter/hour (minimum flow rate) to 150 liter/hour (maximum flow rate),
Pressure applied on bearing by high-speed rotating shaft: maximum 300 KPa, and
Test time: 200 hours.

Under these conditions, gasoline flows through a narrow space between the pump at high flow rate, while high pressure is applied to the bearing by the high-speed rotating shaft of the motor and the bearing is exposed to gasoline flowing through at high flow rate.

After the completion of the practical test, a maximum wear depth on the bearing surface was measured. The measurement results are also shown in Table 3. The strength of the sintered bearing is shown in Table 3 for the purpose of evaluating the strength.

Cu-based sintered alloy is not within a scope of the present invention in, lowering of either strength or wear resistance cannot be avoided.

As described above, the Cu-based sintered alloy bearing of the present invention exhibits excellent wear resistance even when high facial pressure is applied from the rotation shaft with the size reduction and high drive of the motor fuel pump and when used in an environment exposed to liquid fuel flowing through at high flow rate under high pressure, or when liquid fuel contains sulfur or a compound thereof as impurities, not to mention the case of the use as the motor fuel pump of the engine using liquid fuel. Therefore, the Cu-based sintered alloy bearing of the present invention can cope with realization of size reduction and high performance of the engine using liquid fuel.

TABLE 3

| No. | Composition (% by weight) | | | | | Porosity (%) | Crushing strength (N/mm$^2$) | Maximum wear depth ($\mu$m) |
| --- | --- | --- | --- | --- | --- | --- | --- | --- |
| | Ni | P | C | MoS$_2$ | Cu+ impurities | | | |
| Test Examples | | | | | | | | |
| C1 | 21.5 | 0.40 | 1.62 | 1.49 | balance | 14.8 | 142 | 1.3 |
| C2 | 23.1 | 0.42 | 1.54 | 1.52 | balance | 15.6 | 156 | 1.2 |
| C3 | 25.6 | 0.47 | 1.57 | 1.57 | balance | 15.2 | 153 | 1.2 |
| C4 | 28.2 | 0.49 | 1.59 | 1.55 | balance | 15.5 | 149 | 1.2 |
| C5 | 35.3 | 0.46 | 1.53 | 1.50 | balance | 15.3 | 147 | 1.1 |
| C6 | 39.6 | 0.40 | 1.66 | 1.63 | balance | 15.7 | 142 | 1.1 |
| C7 | 23.6 | 0.13 | 1.54 | 1.59 | balance | 14.9 | 127 | 1.6 |
| C8 | 23.2 | 0.34 | 1.49 | 1.61 | balance | 15.4 | 134 | 1.4 |
| C9 | 23.7 | 0.59 | 1.54 | 1.60 | balance | 15.1 | 148 | 1.1 |
| C10 | 23.8 | 0.70 | 1.58 | 1.53 | balance | 15.0 | 144 | 1.0 |
| C11 | 23.4 | 0.87 | 1.48 | 1.48 | balance | 15.7 | 139 | 1.0 |
| C12 | 23.5 | 0.42 | 0.56 | 1.56 | balance | 15.4 | 174 | 1.8 |
| C13 | 23.5 | 0.45 | 1.08 | 1.54 | balance | 15.1 | 151 | 1.4 |
| C14 | 23.0 | 0.48 | 2.86 | 1.65 | balance | 14.7 | 138 | 1.1 |
| C15 | 23.1 | 0.41 | 4.88 | 1.61 | balance | 15.8 | 130 | 1.0 |
| C16 | 23.4 | 0.46 | 1.57 | 0.53 | balance | 15.2 | 158 | 1.6 |
| C17 | 23.7 | 0.44 | 1.61 | 1.05 | balance | 14.9 | 152 | 1.4 |
| C18 | 23.3 | 0.41 | 1.52 | 2.98 | balance | 14.8 | 130 | 1.2 |
| C19 | 23.6 | 0.42 | 1.39 | 4.95 | balance | 15.3 | 121 | 1.0 |
| C20 | 22.9 | 0.43 | 1.55 | 1.54 | balance | 5.38 | 198 | 2.0 |
| C21 | 22.9 | 0.41 | 1.51 | 1.55 | balance | 10.6 | 188 | 1.3 |
| C22 | 23.2 | 0.45 | 1.47 | 1.65 | balance | 19.5 | 131 | 1.6 |
| C23 | 22.8 | 0.44 | 1.46 | 1.57 | balance | 24.7 | 122 | 2.1 |
| Comparative Examples | | | | | | | | |
| C1 | 18.3* | 0.49 | 1.53 | 1.53 | balance | 15.0 | 96 | 1.2 |
| C2 | 41.6* | 0.40 | 1.61 | 1.49 | balance | 14.8 | 99 | 1.0 |
| C3 | 23.1 | 0.06* | 1.57 | 1.56 | balance | 14.9 | 151 | 12.5 |
| C4 | 23.4 | 0.98* | 1.50 | 1.47 | balance | 15.1 | 83 | 1.2 |
| C5 | 22.7 | 0.45 | 0.23* | 1.54 | balance | 15.7 | 161 | 10.9 |
| C6 | 23.4 | 0.43 | 5.44* | 1.63 | balance | 15.4 | 88 | 1.1 |
| C7 | 23.5 | 0.46 | 1.51 | 0.33* | balance | 15.2 | 160 | 10.9 |
| C8 | 23.0 | 0.42 | 1.52 | 6.04* | balance | 15.8 | 83 | 1.0 |
| C9 | 22.9 | 0.48 | 1.66 | 1.60 | balance | 4.2* | 208 | 12.4 |
| C10 | 23.3 | 0.42 | 1.60 | 1.49 | balance | 26.6* | 79 | 2.1 |

In the table, the symbol * means Examples which are not within the scope of the present invention As is apparent from the results shown in Table 3, all Examples C1 to C23 had high strength and excellent corrosion resistance imported by the solid solution phase of the Cu—Ni alloys and also exhibited excellent wear resistance to gasoline flowing through at high flow rate under high pressure when used as the bearing of the motor fuel pump because of the action of pores and the hard Cu—P alloy as well as free graphite and MoS$_2$ having high lubricity, which are dispersed and distributed in the matrix.

On the other hand, as is apparent from the results of Comparative Examples C1 to C10, when either parameter of the content of the component and the porosity of the

What is claimed:

1. A Cu-based sintered alloy bearing for motor fuel pump, which is made of a Cu-based sintered alloy with a composition consisting essentially of 20 to 40% by weight of Ni, 0.1 to 0.9% by weight of P and 1 to 8% by weight of C, and the balance of Cu and inevitable impurities, the Cu-based sintered alloy having a porosity of 5 to 25%.

2. A Cu-based sintered alloy bearing for motor fuel pump, which is made of a Cu-based sintered alloy with a composition consisting essentially of 20 to 40% by weight of Ni, 0.1 to 0.9% by weight of P and 0.5 to 5% by weight of molybdenum disulfide, and the balance of Cu and inevitable impurities, the Cu-based sintered alloy having a structure wherein a hard Cu—P compound and molybdenum disulfide having high lubricity are dispersed and distributed in a matrix made of a solid solution phase of a Cu—Ni alloy, and having a porosity of 5 to 25%.

3. A Cu-based sintered alloy bearing for motor fuel pump, which is made of a Cu-based sintered alloy with a composition consisting essentially of 20 to 40% by weight of Ni, 0.1 to 0.9% by weight of P, 0.5 to 5% by weight of C and 0.5 to 5% by weight of molybdenum disulfide, and the balance of Cu and inevitable impurities, the Cu-based sintered alloy having a structure wherein a hard Cu—P compound as well as free graphite and molybdenum disulfide having high lubricity are dispersed and distributed in a matrix made of a solid solution phase of a Cu—Ni alloy, and having a porosity of 5 to 25%.

* * * * *